(12) United States Patent
Olney et al.

(10) Patent No.: US 7,302,344 B2
(45) Date of Patent: Nov. 27, 2007

(54) DRIVER ADAPTIVE COLLISION WARNING SYSTEM

(75) Inventors: Ross D. Olney, Agoura Hills, CA (US); Suradech Manorotkul, Camarillo, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/702,824

(22) Filed: Feb. 6, 2007

(65) Prior Publication Data

US 2007/0198191 A1 Aug. 23, 2007

Related U.S. Application Data

(62) Division of application No. 10/684,757, filed on Oct. 14, 2003, now Pat. No. 7,206,697.

(51) Int. Cl.
*G06F 17/10* (2006.01)
(52) U.S. Cl. .................... 701/301; 701/300; 180/272
(58) Field of Classification Search ........ 701/200–213, 701/93, 98, 300, 301, 23, 24, 27; 340/903; 342/29, 91; 180/272
See application file for complete search history.

(56) References Cited

U.S. PATENT DOCUMENTS 6,275,773 B1 * 8/2001 Lemelson et al. .......... 701/301
6,560,525 B1 * 5/2003 Joyce et al. .................. 701/96
6,873,911 B2 * 3/2005 Nishira et al. .............. 701/301

* cited by examiner

Primary Examiner—Richard M. Camby
(74) Attorney, Agent, or Firm—Jimmy L. Funke (57) ABSTRACT

The present invention involves methods and systems for issuing a collision warning to a driver at timing based on the driver's attitude level. The methods involve the steps of determining the driver attitude level based on the driver's actions in a plurality of driving conditions, determining timing for issuing warning based on the driver attitude level, and issuing warning based on the determined timing. The systems include a first device for collecting data associated with driver attitude, and a second device connected to the first device for determining a driver attitude level. The second device includes a processor for processing the data by applying pre-determined algorithm to determine the driver attitude level. The systems may further include a third device connected to the second device for determining timing for issuing warning corresponding to the driver attitude level, and issuing a warning according to the determined timing. Alternatively or additionally, the third device may include a software for enabling a determination of the rate of change in terms of acceleration and deceleration, and a control for affecting the rate of change. Further, the third device may include a software for enabling a determination of a safety distance and a distance control.

14 Claims, 8 Drawing Sheets

DRIVER ADAPTIVE COLLISION WARNING SYSTEM

CROSS-REFERENCE TO RELATED APPLICATION

This application is a divisional application of U.S. Ser. No. 10/684,757, filed Oct. 14, 2003 now U.S. Pat. No. 7,206,697.

TECHNICAL BACKGROUND

1. Field of the Invention

The present invention relates to car safety system, particularly collision warning system capable of alerting a driver of a collision potential.

2. Description of the Related Art

Automatic collision warning systems for a vehicle operate based on input data relating to the mental and physical condition of the driver including his behavior during adverse road conditions. The input data can be used by the systems to generate output control affecting timing of audio, visual, and tactile collision warnings.

The state of the art for present collision warning systems may require an input from the operator of the vehicle by way of a dash-mounted control knob. The precise degree of this input is the operator's best judgment as to whether they are an aggressive or conservative driver. A mis-interpretation of this characteristic, or simply a mis-adjustment, can have severe consequences on the performance of the collision warning system.

Another known danger avoidance system includes a driver monitoring system for monitoring the driver's physical condition and behavior such as the driver's line of sight, the blinking of the driver, the blood pressure, the pulse count, and the body temperature. The data from the driver monitoring system coupled with the data from other monitoring systems such as the ambient condition monitoring system and vehicle condition monitoring system are used as the basis to prompt danger recognition that effectuates the danger avoidance system to give warning. The shortcoming of the system includes warning given too early for a driver who is aggressive in driving behavior, who tends to drive fast and keeps a short distance from the leading vehicle. On the other hand, the warning may be too late for a driver who is conservative in driving behavior, who tends to drive slowly and keeps a long distance from the leading car.

An error in one direction causes false alarms which are feared to be the primary cause of the above types of systems being disabled, and then of no benefit at all. And an error in the other direction may allow the system to alert so late as to be useless, and thereby possibly aiding in the potential accident and creating a liability situation.

SUMMARY OF THE INVENTION

The present invention provides systems and methods for issuing collision warnings with individualized timing responsive to individual driver's behavior or attitude level.

Generally, the method of the present invention comprises the steps of: determining a driving style including a driver attitude level, determining timing for issuing a warning based on the determined driving style, and issuing a warning based on the determined timing.

In one specific embodiment, the driver attitude level is determined based on data related to the driver's actions in plurality of driving conditions. The parameters associated with the actions may be measured and transformed mathematically by applying pre-determined algorithm to obtain parametric values representing the driver attitude level.

In another specific embodiment, the method comprises the steps of: collecting data corresponding to at least one parametric model (PM) relating to driver attitude; determining parametric model (PM) value distribution for each PM; and determining an individual driver attitude based on individual driver data and the parametric (PM) value distribution for the at least one parametric model (PM).

In one aspect of the present invention, the parametric model (PM) value distribution may be determined by applying pre-determined algorithm corresponding to each of the PMs, such as calculating percentile values representing the PM value distribution.

In another aspect, the method may include the steps of: determining an average value for each PM value distribution; and determining a parametric-specific attitude level for each PM by mapping the average value for each PM value distribution to a pre-determined scale specific to each PM. The value mapping may be based on a scale of 0 to 10, wherein 0 represents most conservative driver attitude level, and 10 represents most aggressive driver attitude level.

In one form of the invention, the data may be collected under a plurality of driving conditions, and by at least one sensor integrated to an automobile.

In one exemplary embodiment, the method includes at least one of the following parametric models (PMs): host vehicle velocity (hostv) PM for capturing how fast a driver drives in an absence of a lead vehicle, acceleration (hostacc) PM for capturing acceleration profile as a function of hostv, and drive's allowable response time ($T_{ares}$) PM for capturing how much time the driver is allowed to react to an extreme stop condition without colliding with a lead vehicle.

The present invention further provides a system for forewarning a driver of potential collision comprising: a first device for collecting data corresponding to driver attitude; and a second device connected to the first device for determining driver attitude level from the collected data.

The second device may comprise software for enabling storing of the collected data, and a processor for processing the data according to pre-determined algorithm to determine driver attitude level. The first device may be capable of collecting data corresponding to driving actions in a plurality of driving conditions and from a plurality of drivers.

In another aspect of the invention, the second device further comprises software for enabling selection of data according to pre-determined criteria; and the processor is capable of processing the selected data.

In another embodiment, the system further comprises a third device functionally connected to the second device for determining timing for warning based on the driver attitude level, and issuing a warning according to the precise timing. The third device may comprise software for enabling determination of the timing for warning and an alarm for producing a perceptible signal. The alarm may include an audio, a visual or a tactile alarm.

One object of the invention is to provide a forewarning system that is capable of issuing warning to a driver at precise time to ensure safety.

Another object of the invention is to provide a forewarning system that issues warnings according to the driver's attitude.

Yet another object of the invention is to provide a system for determining drivers' attitude that can be integrated to existing forewarning components.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION OF THE INVENTION

The present invention provides systems and methods for forewarning a driver of a potential collision. The warning is issued at timing adapted to the driver's driving style or attitude level. The driving style may be determined by the driver's behavior or acts in response to certain driving conditions or occurrences. The driving style may also be characterized in terms of attitude, which ranges from conservative to aggressive.

There is a number of approaches that can be used to determine the driving style or attitude of a driver. In one exemplary approach, the driver's attitude is determined using learning algorithm based on Memory-Based Learning (MBL) approach. In this specific approach driver models are created to represent the driver's behavior which may be described in the terms of what the driver usually does based on a given set of parameters and how the driver reacts to driving situations. For example, with a given current velocity and following distance, the driver tends to slow down or speed up.

With the knowledge of how an individual driver behaves, his/her attitude level can be estimated with regard to how aggressive this driver is, relative to other drivers. A confidence level may be calculated based on the quantity of data learned. These attitude and confidence levels may be processed within a collision warning system to appropriately adjust warning timing according to the driver's driving style.

The driver behavior may change, depending on driving conditions, for example, weather condition, traffic condition, and the time of day. Behavior during car-following is likely to be different from that during lane changing. Examples of various driving conditions are shown in Table 1.

TABLE 1

Examples of various driving conditions

| Condition Type | Alternative State |
| --- | --- |
| Scenario | Accelerating: -while moving/-from stopping |

TABLE 1-continued

Examples of various driving conditions

| Condition Type | Alternative State |
| --- | --- |
| | Decelerating: -while moving/-to stopping |
| | Changing lane/Passing/Cutting off/Parking/Reversing |
| Lane | Straight/Curve/Winding/Up hill/Down hill/Intersection/Corner |
| Traffic | Car in front/Car on left/Car on right/Car in rear |
| | Combinations/No cars |
| Road | Dry/Wet/Icy |
| Weather | Clear/Raining/Snowing/Foggy/Windy |
| Time of Day | Day/Night/Dusk/Dawn |
| MMM Devices | Off/On |
| Mode | Normal/ACC engaged |

In addition, the parameters such as velocity, acceleration, yaw rate, lane position, etc., which may be selected to represent the driver behavior, may also vary from one driving condition to another. Moreover, driver behavior may change over a period of time. As a result, the driver model should have the following characteristics: 1) customized to individual driver, 2) adaptive to change of driving style for a) different driving conditions and b) over time, 3) comprised of various driving-condition-specific sub-models, 4) each driving-condition-specific sub-model is generated by processing data, obtained from an identified driving condition, and collected from monitored parameters, 5) set of monitored parameters may vary depending on driving conditions, and 6) different driving conditions may, if possible, share the same sub-model in order to minimize the number of sub-models.

Figure 1:
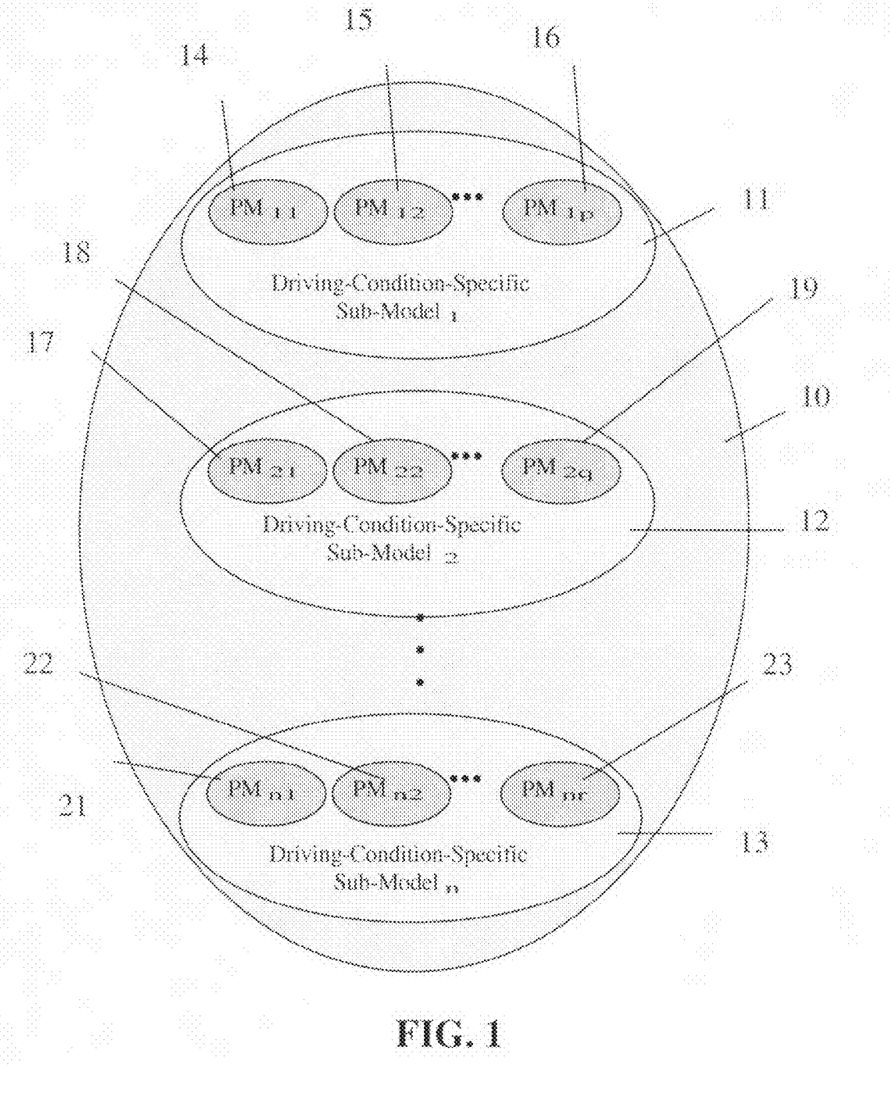
FIG. 1 is a diagram showing a structure of parametric models according to an embodiment of the present invention.

Referring now to FIG. 1, a schematic diagram of a structure of driver model 10 is illustrated. Driver model 10 comprises of a plurality of driving-condition-specific sub-models 11-13. Each of these sub-models 11-13 contains multiple sub parametric models. For example, in driving-condition-specific sub-model 11, there are "p" number of PMs 14-16, in driving-condition-specific sub-model 12, there are "q" number of PMs 17-19, and in driving condition specific 13, there are "r" number of PMs 21-23. A PM represents data distribution of a monitored parameter such as acceleration, velocity, etc.

PM Value distribution can be transformed by applying Learning Algorithm or Memory-Based Learning (MBL) with percentile. Generally, MBL can be used as a predictor or classifier, where the answer to a query is a function of answers to past training examples, which are similar to the current query. All past training examples are stored in memory. The memory can be a one or multi-dimensional array depending on the number of training input states.

Figure 2:
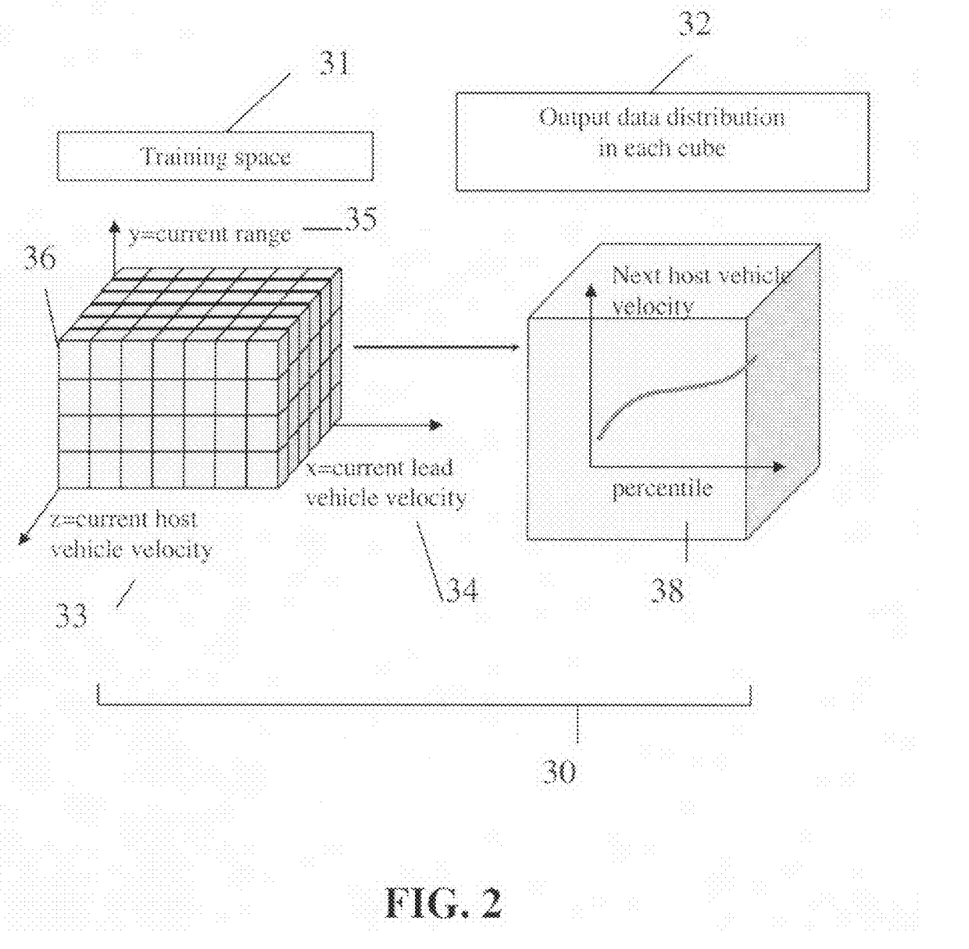
FIG. 2 is a conceptual diagram showing memory-based distribution learning, training input states and output data according to one embodiment of the present invention.

As illustrated in FIG. 2, MBL 30 may be utilized for learning driving behavior. MBL 30 may be used to learn what the driver usually does, and how the driver reacts to specific situations. For these purposes, past driving data of relevant parameters (for instance, velocity or acceleration) are stored in the memory, representing the data distribution of those parameters, and the past reactions of the driver to various driving situations are used to train the system to learn the driver response for any given situation. Training space 31, represented by cube 36, contains data corresponding to three driving conditions 33-35. The driving conditions 33-35 include current lead vehicle velocity 34, represented by the x-axis, current range (following distance) 35 represented by the y-axis, and current host vehicle velocity 33 represented by the z-axis. The driver reaction is characterized as the host vehicle velocity value at t seconds after the given situation occurred. Output data (learned data) may be determined using a variety of pre-determined algorithm to transform the input data distribution. For example, output data distribution 32 for host vehicle velocity is derived from the input data distribution as values of percentiles 38.

Figure 3:
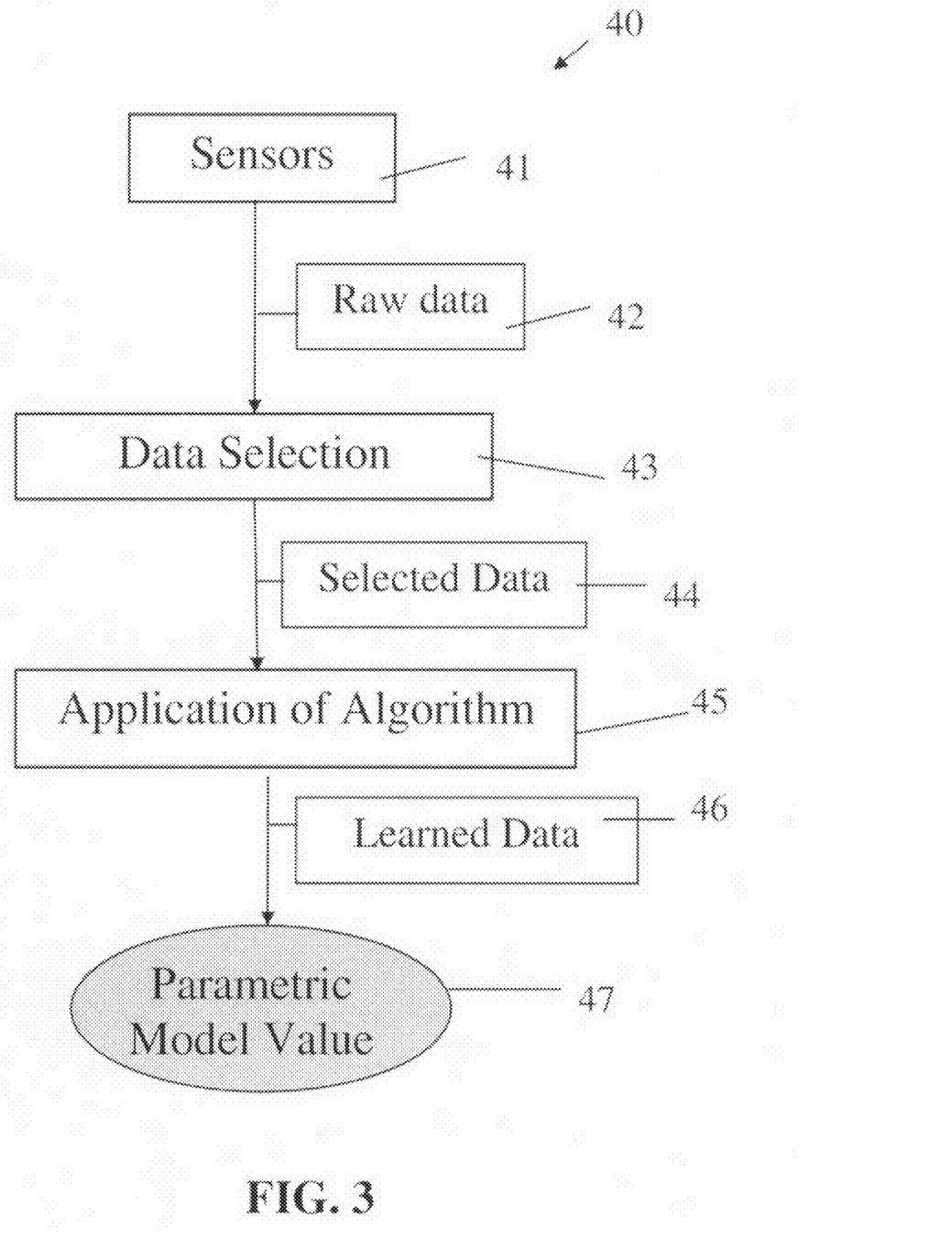
FIG. 3 is a flow chart diagram showing a method for creating a parametric model of the present invention.

Referring now to FIG. 3, the flow chart further illustrates the process for creating parametric model PM values (PMV). Process 40 can be used to create PMV 47. First raw data 42 for a specific parametric model is collected. The collection of raw data 42 may be accomplished through a variety of traditional means such as sensors for detecting automobile's or driver's performance, or other driving conditions as listed in TABLE 1 shown hereinabove. For example, sensor 41 may be mounted on or integrated with an appropriate mechanism of a vehicle to capture raw data during a driver operating the vehicle. The collected raw data 42 are subject to step of data selection 43, in which a portion of raw data 42 that does not meet certain selection criteria is discarded in order to eliminate noisy and meaningless data. Depending on measured parameters, the selection criteria should capture the aggression level of the driver. For instance, acceleration data between 0 and 0.8 mph/s could be clipped out since these small acceleration data occur too frequently and do not provide much information about the driver attitude. The selected data 44 are then modified by applying pre-determined learning algorithm at step 45 to generate learned data 46. For example, selected data 44 may be sorted and the values of the percentiles from 0 to 100 are calculated and stored in the memory. These percentile values, or PMV representing the data distribution of the measured parameter.

In a simplified embodiment, only one PM may be used to determine the driver attitude. For example, if the PM used is acceleration PM, the selected data based on criteria specific to acceleration PM that are collected and stored in each bin of the memory is first sorted (e.g. in ascending order). Then, a learning algorithm (calculation of acceleration values base on percentile values from 0 to 100) will yield learned data distribution which represents PMVs of measured acceleration distribution. In this acceleration PM, a value of x for the percentile y means that in y % of the selected data, the driver's acceleration is less than x.

In another embodiment, a plurality of PMs may be used to determine the driver attitude. The examples of possible PMs are listed in Table 2.

TABLE 2

Examples of parameters used for determining driver attitude; "X" denotes "certainty relevant", "Y" denotes "possibly relevant"

| Parameters | Attitude (conservative <-> aggressive) |
|---|---|
| range | X |
| velocity | X |
| acceleration | X |
| deceleration | X |
| lateral acceleration | X |
| curvature vs speed | X |
| reaction time | X |
| brake timing | X |
| lane-changing frequency | X |
| RPM | X |
| throttle angle | X |
| throttle angle rate | X |
| yaw | Y |
| yaw rate | Y |
| lane position | Y |
| etc. | |

Figure 4:
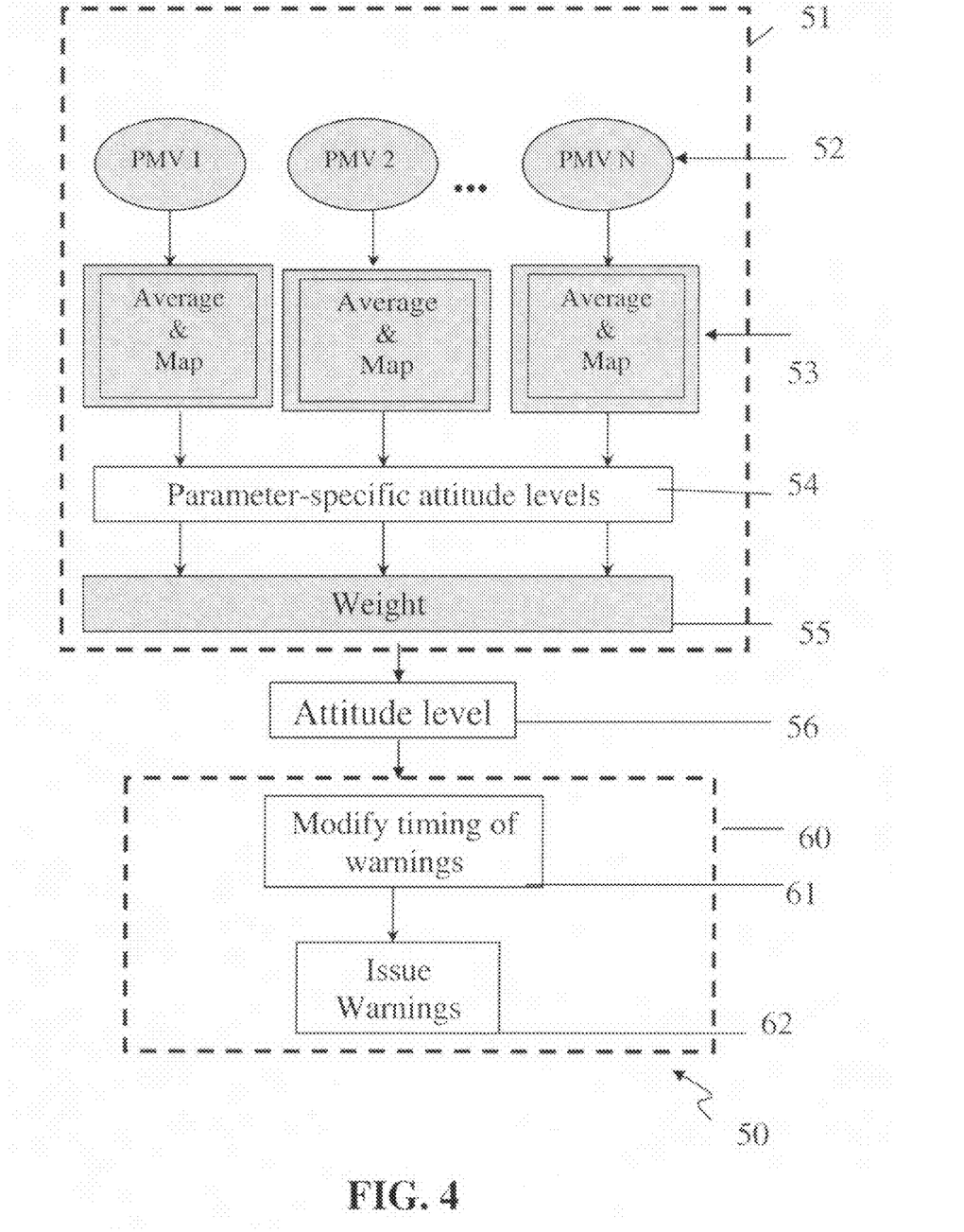
FIG. 4 is a flow chart diagram showing a method for determining a driver attitude according to one embodiment of the present invention.

In either simplified or more complex examples, the driver attitude may be derived from PM values by following the steps shown in flow chart in FIG. 4. The PMV or the percentile values of each parametric model PM 52 stored in the memory are processed through step 53 to obtain the average of the PM values, which are mapped to a scale between 0 (most conservative) and 10 (most aggressive) to determine the driver attitude level, relative to other drivers. The PM values may be averaged in many ways depending on the parameter and its data distribution. Basically, the averaged PM values should represent the aggression level of the driver. In order to map the scale appropriately, an individual averaged PM value must be compared to a range of data obtained from the general population. Each attitude level derived from a single PM is called parameter-specific attitude level. The plurality of parameter-specific attitude levels 54 obtained from a plurality of PMV 52 may be combined. When combined, the parameter-specific attitude levels 54 may be suitably weighted in step 55 in order to estimate the overall driver attitude. The parameter's degree of relevance to driver attitude determines the weight. The higher the degree of relevance, the higher the weight is. The overall driver attitude level 56 can be sent to a warning system, particularly electronically to be processed as in step 61 so that the warning system determines the timing to issue warning signals in step 62 adaptive and optimal to an individual driving style.

As demonstrated in FIG. 4, the overall process for forewarning a driver of a potential collision may be conducted by a combined system 50, which comprises "Driver Radar Enhanced Adaptive Modeling (DREAM) System" 51 for determining the driver attitude as described hereinabove, and a "Forward Collision-Warning (FCW) System" 60 for determining timing and issuing warning signals corresponding to driver attitude levels. The FCW system 60 may include any commercially available system that can perform timing determination and issue a warning.

In a specific embodiment, three PMs are used to determine the driver attitude. These PMs include host vehicle velocity (hostv), acceleration (host_acc), and driver's allowable response-time $T_{ares}$.

The hostv PM is used for measuring driver attitude in host vehicle velocity. This PM captures how fast the driver drives in the absence of a lead vehicle (data selection criterion 1). Velocities under a specified speed, for example, 55 mph, are clipped out (data selection criterion 2) since they are significantly lower than a legal speed limit on the highway. This PM is measured only when there is no lane change (data selection criterion 3). The selected hostv data are sorted and the parameter values for the percentiles from 0 to 100 are calculated. These percentile values are stored in the memory, representing the hostv PM.

The host_acc PM is used for measuring driver attitude is the acceleration of host vehicle (host_acc). The model captures acceleration profile as a function of hostv. Therefore, the memory contains hostv bins ranging from 2 to 90 mph with bin size of 1 mph. Accelerations below a specified acceleration rate, for example, 0.8 mph/s (data selection criterion 1), are considered to be too small to be meaningful and, therefore, may be clipped out. This PM is measured only when there is no lane change (data selection criterion 2). Each of the selected host_acc data is stored in the appropriate hostv bin. Then the data in each hostv bin may be sorted and their percentile values are calculated.

The $T_{ares}$ PM is used to determine how much time the driver is allowed to react to an extreme stop condition without colliding with the lead vehicle. The driver, who usually follows the lead vehicle with short $T_{ares}$, is likely to be an aggressive driver since he/she has less time to deal with such situation. This $T_{ares}$, estimated from host vehicle velocity, lead vehicle velocity, and range, can be obtained by solving a second order polynomial equation (1) shown below.

$$0 = \left[\frac{a_{\max}}{2}\left(1 + \frac{a_{\max}}{d_{\max}}\right)\right]T_{ares}^2 +$$
$$\left[\text{host\_v}\left(1 + \frac{a_{\max}}{d_{\max}}\right) + \left(\frac{a_{\max}sum_{ad}}{J_{\max}}\right) + \frac{a_{\max}}{2d_{\max}J_{\max}}(2a_{\max}sum_{ad} - sum_{ad}^2)\right]T_{ares} +$$
$$\left[\left(\frac{hostv^2 - leadv^2}{2d_{\max}}\right) + \frac{sum_{ad}hostv}{J_{\max}}\left(1 + \frac{1}{d_{\max}}\left(a_{\max} - \frac{sum_{ad}}{2}\right)\right) + \right.$$
$$\left.\frac{sum_{ad}^2}{2J_{\max}^2}\left(a_{\max} - \frac{sum_{ad}}{3}\right) + \frac{1}{2d_{\max}}\left(\frac{2a_{\max}sum_{ad} - sum_{ad}^2}{2J_{\max}}\right)^2 - range\right]$$

equation (1)

where $a_{max}$ is the maximum acceleration, $d_{max}$ is the maximum deceleration, $J_{max}$ is the maximum allowed jerk, and $sum_{ad}$ is the summation of $a_{max}$ and $d_{max}$. In one implementation, $a_{max}$, $d_{max}$, and $J_{max}$ may be set to 3.92 m/s², 7.84 m/s², and 76.2 m/s³, respectively. Since $a_{max}$, $d_{max}$ and $J_{max}$ are empirically constants, $T_{ares}(t) = f(hostv(t), leadv(t), range(t))$.

An extreme stop condition is the condition where, at the moment the lead vehicle driver initiates a stop maneuver, the lead vehicle is assumed to be at full deceleration ($d_{max}$) with initial lead velocity leadv(0) while the host vehicle is at highest acceleration ($a_{max}$) with initial host velocity hostv(0). Driver's reaction time ($T_{res}$) is the time period from the point where the stop maneuver commences until the host vehicle driver notices it and reacts to the situation by applying a brake with $d_{max}$. It is assumed that the maximum allowable jerk during deceleration from $a_{max}$ to $d_{max}$ is $J_{max}$. It is also assumed that both vehicles have the same $a_{max}$, $d_{max}$ and $J_{max}$, and these parameters are all constant.

This extreme stop approach has been originally used to calculate the minimum safety following distance (Sd) as shown in equation (A1) (See P. A. Ioannou, C. C. Chien, "Autonomous Intelligent Cruise Control," IEEE Transactions on Vehicular Technology, Vol. 42, No. 4, November 1993).

$$Sd = \frac{hostv^2(0) - leadv^2(0)}{2a_{\max}} +$$
$$hostv(0)\left(T_{res} + \frac{sum_{ad}}{J_{\max}} + \frac{1}{d_{\max}}\left(a_{\max}T_{res} + \frac{a_{\max}sum_{ad}}{J_{\max}} - \frac{sum_{ad}^2}{2J_{\max}}\right)\right) +$$
$$\left(\frac{a_{\max}T_{res}^2}{2} + \frac{a_{\max}sum_{ad}^2}{2J_{\max}^2} - \frac{sum_{ad}^3}{6J_{\max}^2} + \frac{a_{\max}sum_{ad}}{J_{\max}}T_{res} + \right.$$
$$\left.\frac{1}{2d_{\max}}\left(a_{\max}T_{res} + \frac{a_{\max}sum_{ad}}{J_{\max}} - \frac{sum_{ad}^2}{2J_{\max}}\right)^2\right)$$

equation (A1)

where $sum_{ad} = a_{max} + d_{max}$.

In the present embodiment, the following distance (Sd), host and lead vehicle velocities are obtained from the radar. Therefore, the only unknown parameter in equation (A1) is $T_{res}$. By rewriting this equation, $T_{res}$ can be obtained by solving the second order polynomial equation as shown in equation (1).

$T_{res}$, which is estimated from the other parameters in equation (1), is, in fact, not the actual driver's response time. But it is the time that the driver is allowed to react in order to avoid colliding with the lead vehicle under the extreme stop condition.

Therefore $T_{res}$ obtained from equation (1) is renamed to "driver's allowable response-time" ($T_{ares}$).

If the driver usually follows the lead vehicle (data selection criterion 1) with a short allowable response-time, he/she would have less time to deal with the extreme stop condition. Thus, the shorter the allowable response-time is, the more aggressive the driver is. For PM, the data are selected when there is no lane change (data selection criterion 2), leadv−hostv<5 mph for 1 second (data selection criterion 3), and $T_{ares} < \overline{T_{ares}} + (2*std(T_{ares}))$, where $\overline{T_{ares}}$ is an approximate average and $std(T_{ares})$ is an approximate standard deviation, of all selected $T_{ares}$ data (data selection criterion 4).

The third criterion assures that $T_{ares}$ data, which are not caused by the host vehicle driver's intention, are eliminated. While the forth criterion removes $T_{ares}$ data which are too high.

Similar to other PMs, $T_{ares}$ values of the percentiles from 0 to 100 of the selected data in each hostv bin are calculated and stored in the memory.

Table 3 summarizes the training state inputs, output data distribution, and data selection criteria of all three PMs listed in this specific embodiment.

TABLE 3

Summary of data criteria for all three PMs

| Parametric Model | Training input state | Output data distribution | Data selection criteria |
| --- | --- | --- | --- |
| Host vehicle speed | — | hostv | 1) Lead vehicle non-exist |
| | | | 2) hostv > 55 mph |
| | | | 3) Not lane changing |
| Acceleration | hostv | host_acc | 1) host_acc > 0.8 mph/s |
| | | | 2) Not lane changing |

TABLE 3-continued

Summary of data criteria for all three PMs

| Parametric Model | Training input state | Output data distribution | Data selection criteria |
|---|---|---|---|
| Driver's allowable response time | hostv | Tares | 1) Lead vehicle non-exist<br>2) Not lane changing<br>3) leadv-hostv > 5 mph for 1 second<br>4) Tares < Tares + (2*std(Tares)) |

EXAMPLE 1

Driver Model Creation and Determination of Values of PMs

Experiments were performed using two drivers A and B. Raw driving data related to hostv, host_acc, and $T_{ares}$ PMs, as described hereinabove were collected from the two drivers. Additionally, four artificial driver models C, D, E, F were also created from the data collected from the real driver A. Table. 4 explains how the data in these artificial driver models were simulated. It should be noted that each driver model contained all three PMs.

TABLE 4

Artificial drivers and how their data were simulated

| Artificial Driver | How to simulate data |
|---|---|
| C | Reduce hostv by 10% and increase range by 10% on Driver A's data |
| D | Reduce hostv by 15% and increase range by 20% on Driver A's data |
| E | Increase hostv by 5% and reduce range by 40% on Driver A's data |
| F | Increase hostv by 5% and reduce range by 20% on Driver A's data |

Figure 5A:
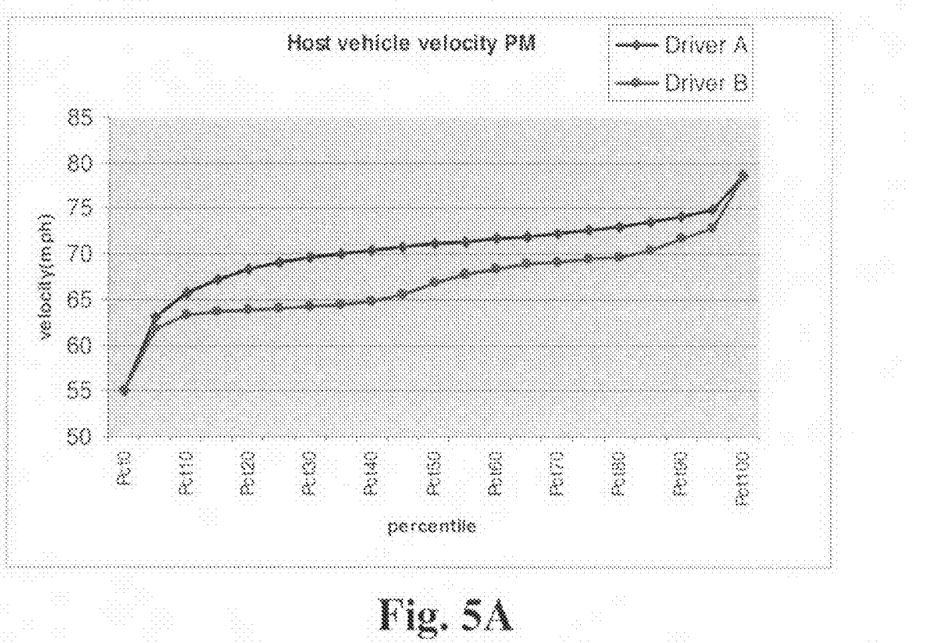
FIGS. 5A-5E are graphs of results obtained from a method according to one embodiment of the present invention.
Figure 5B:
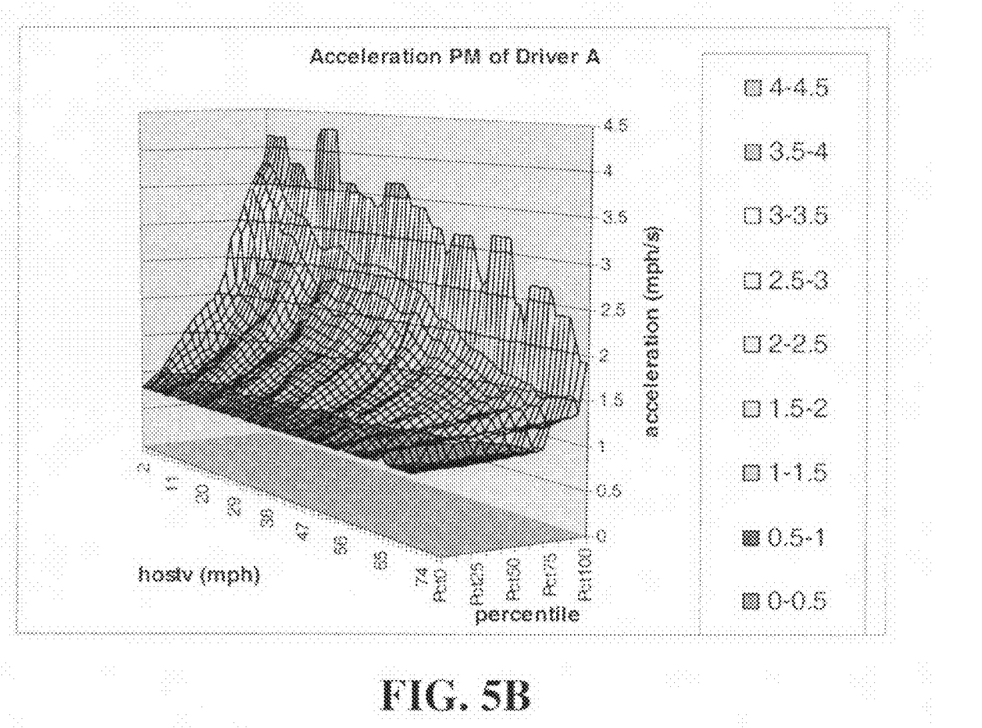
Figure 5C:
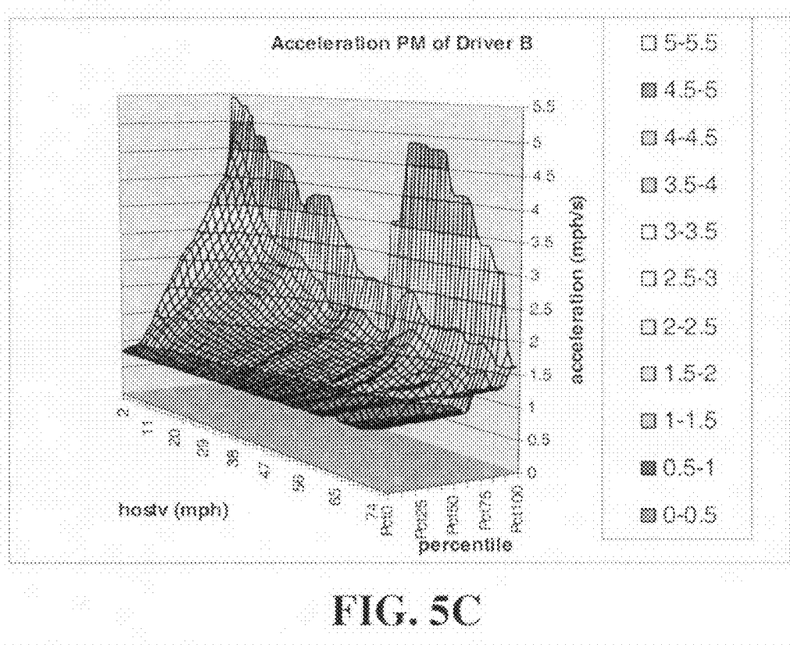
Figure 5D:
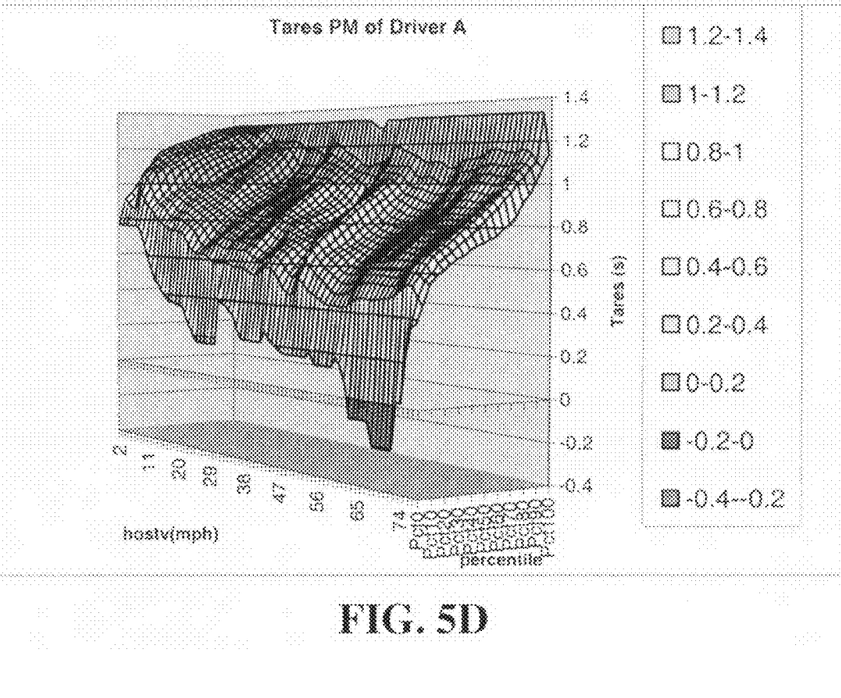
Figure 5E:
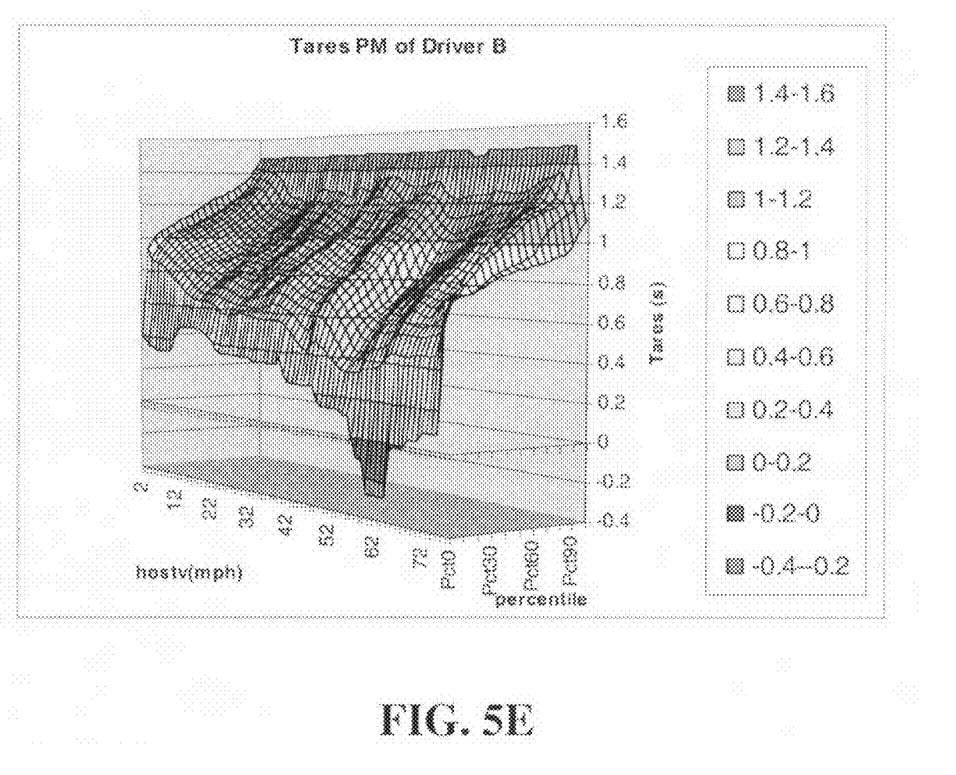

Once the raw data were collected, they were processed by applying appropriate pre-determined algorithm corresponding to each PM, as described hereinabove. The output data (learned data) were reported in percentile values, representing the data distribution of each measured parameter. All PM values were created off-line. The results are shown in FIGS. 5A-5B. FIG. 5A shows output data distribution inside host vehicle velocity PM of Driver A and B. FIG. 5B shows data distribution inside acceleration PM of Driver A, FIG. 5C shows data distribution inside acceleration PM of Driver B, FIG. 5D shows data distribution inside $T_{ares}$ PM of Driver A, and FIG. 5E shows data distribution inside $T_{ares}$ PM of Driver B. The percentile values for the real drivers A and B, and simulated drivers C, D, E, and F were also generated and further processed as described hereinbelow.

EXAMPLE 2

Driver Attitude Determination

The overall driver attitude level was determined according to the following steps:

Step (1): Obtaining an Average Value of Each PM

The average value of the output data stored in each PM (data stored in the PM were represented by values at the percentiles from 0 to 100, as shown in FIGS. 5A-5E) was calculated. This average value represents the driver's aggression level, based on a single parameter. A method to average the data varied, depending on the parameter. For $T_{ares}$ and acceleration PMs, the lowest and highest five percents of data were thrown out. Only the values of the percentiles between 5 and 95 were averaged. For the host vehicle velocity PM, only the hostv values of the percentiles between 80 and 95 were averaged. The average values for all parameters for all drivers were shown in Table 6 hereinbelow.

Step (2): Calculating Parameter-Specific Attitude Level

To determine the parameter-specific attitude level, a global min-max (minimum to maximum) range of each parameter was set first. This min-max range was an outcome from an extensive study on various drivers to determine the minimum and maximum values of each parameter. This min-max range was mapped to scales between 0 (most conservative) and 10 (most aggressive). For the present study, the global min-max range of each parameter was assumed to be as shown in Table 5. It should be noted that the shorter $T_{ares}$, the higher the scale was (opposite to the other two parameters).

TABLE 5

Experimental setting for each parameter

| Parameters | Min-Max | Scale | Weight | Method to average data |
|---|---|---|---|---|
| Tares | 0.5-1.3 (s) | 10-0 | 6 | Average values of percentiles between 5 and 95 |
| host_acc | 1.0-1.6 (mph/s) | 0-10 | 2 | Average values of percentiles between 5 and 95 |
| host | 60-80 (mph) | 0-10 | 1 | Average values of percentiles between 80 and 95 |

By mapping the average data from step (1) to the min-max range, a parameter-specific attitude level (or scale) could be computed. The calculated parameter-specific attitude levels of all parameters are shown in Table 6.

Step (3) Estimating Overall Attitude Level of the Driver

A weight for each parameter was determined prior to computing the overall attitude level. In the present example, the weights for all parameters were set as shown in Table 5. By weighting the parameter-specific levels (results from step (2)), the overall attitude level can be calculated. The results are shown in Table 6.

The results, as shown in Table 6 indicate that the present algorithm successfully detected the driver attitude level 3. Real Driver A had an overall driver attitude level of 6 and Driver B had an overall driver attitude level of 5 means that Driver A was more aggressive than Driver B. Driver D had an overall driver attitude level of 3, indicating that Driver D is the most conservative among all drivers. On the other hand, Driver E having an overall driver attitude level of 9 was the most aggressive.

TABLE 6

Summary of results

| | Averaged Parameter value | | | Attitude Level | | | |
|---|---|---|---|---|---|---|---|
| | $T_{ares}$ | host_acc | hostv | Parameter-specific Level | | | |
| Driver | (s) | (mph/s) | (mph) | $T_{ares}$ | host_acc | hostv | Overall |
| A | 0.9 | 1.4 | 73.9 | 5.5 | 6.0 | 6.9 | 6 |
| B | 0.9 | 1.4 | 71.1 | 4.8 | 7.3 | 5.6 | 5 |
| C | 1.0 | 1.3 | 66.5 | 3.1 | 4.8 | 3.3 | 4 |
| D | 1.1 | 1.3 | 62.9 | 2.3 | 4.3 | 1.5 | 3 |
| E | 0.5 | 1.4 | 77.6 | 9.6 | 6.7 | 8.8 | 9 |
| F | 0.7 | 1.4 | 77.6 | 7.4 | 6.7 | 8.8 | 7 |

By providing the overall attitude level to the warning system, at the same driving conditions and kinematics, a more-conservative driver (lower level number) should and would be alerted earlier than more-aggressive drivers would. In other words, the timing to issue warning signals is automatically adjusted according to the individual's driving style.

Although the exemplary embodiments of the current method are focused on driving on highway and car following case only (without lane changing), initial experimental results show that the method of the present invention may be adapted to provide useful data (attitude level) about an individual driver for any warning system to appropriately adjust the warning timing to suit his/her driving style. As previously described, the timing for forewarning may be adjusted to the driver's attitude in different driving conditions as shown in the examples listed in Table 2.

In addition, the same concept of learning individual driver behavior and to use such information to improve the performance of Forward Collision Warning (FCW) can also be expanded to both conventional cruise control and adaptive cruise control.

In the conventional cruise control, when the driver presses the Resume button, the vehicle speeds up from the current speed to a previous set speed. The rate of the change of the speed is usually controlled by a speed profile (created by test engineers) and fixed. As a result, a conservative driver may feel unsafe if the car accelerates too fast. On the other hand, an aggressive driver may feel that the car is sluggish if the speed increases too slowly.

By learning how the driver normally accelerates, a speed profile can be created to match individual driving styles. This profile is used to control the speed of the vehicle during the Resume operation, providing more comfort/safety to the driver. In some cases, the speed profile of extremely aggressive drivers may be modified to ensure safety.

Adaptive cruise control is an extension of the conventional cruise control. The system uses a sensor (radar or laser) to detect the front vehicles. When the traffic is clear, it operates in the same manner as the conventional cruise control—maintaining the set speed. However, when the vehicle encounters traffic, the vehicle slows down and maintains a safety distance to the lead vehicle. Once the traffic is clear again, the vehicle speeds up to the set speed.

In the current technologies, the safety distance is set by the driver in terms of Time to Collide (TTC). TTC=Distance to the lead vehicle/host-vehicle speed. The driver sets this TTC via a knob or button on the dash board (typically, between 1-2.5 seconds).

Having knowledge of how typically the driver drives, the system can automatically adjust the safety distance according to individual driving style—providing more comfort and the feeling as if the driver drives the car him/herself. The knob or button is no longer required.

In addition, the driving style information can be used to adjust the rate of the change of the speed when the vehicle needs to slow down (when approaching the traffic) or to speed up (when the traffic is clear).

Figure 6:
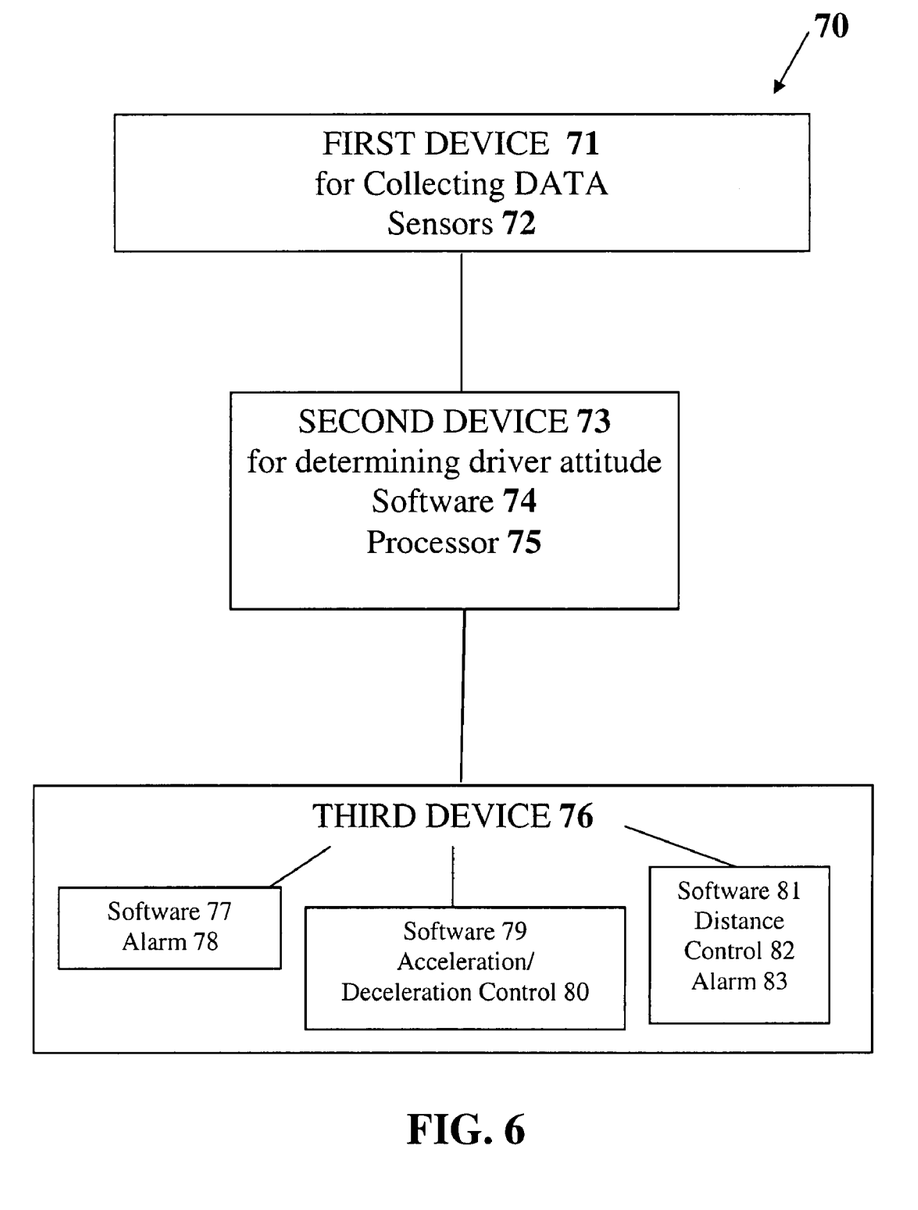
FIG. 6 is a block diagram of a device assembly according to one embodiment of the present invention.

Referring now to FIG. 6, device assembly 70 of the present invention, which may be incorporated into a vehicle control system, comprises first device 71 for collecting data, and second device 73 for determining driver attitude level connected functionally to first device 71. First device 71 may include a plurality of sensors 72 capable of detecting driver actions in various situations and driving conditions. Second device 73 may include software 74 enabling storing of data received from sensors 72, and processor 75 for processing the stored data. Processor 75 can apply pre-determined algorithm to the stored data to generate parametric model values which relate to driver attitude as described hereinabove. Processor 75 is capable of determining attitude levels of a plurality of drivers from corresponding parametric model values.

Device assembly 70 may also comprise third device 76 which may have software 77 for enabling determination of timing of warning responsive to a driver attitude level and enabling alarm 78 to issue any variety of signals to warn the driver of a potential collision. Alarm 78 may produce an audio, a visual, or a tactile signal or sign or any combination thereof. Differing signals or signs may represent different types of potential collision. The driver can respond appropriately to a specific warning signal.

Alternatively or additionally, device assembly 70 may be integrated in a cruise control of a vehicle. In such a case, third device 76 may include software 79 for enabling a determination of rate of change of speed in terms of acceleration and deceleration responsive to the driver attitude level; and acceleration and deceleration control 80 for adjusting the rate of change of speed in terms of acceleration and deceleration based on the determined rate of change.

Furthermore, alternatively or additionally, third device 76 may contain software 81 enabling a determination of a safety distance from another vehicle based on the driver attitude level, and a distance control 82 for maintaining the determined safety distance. The distance control 82 may include an alarm 83 for warning the driver when the vehicle gets too close to the other vehicle, violating the safety distance. The driver may then act appropriately to keep the vehicle at the determined safety distance.

While the present invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system integrated in a vehicle for forewarning a driver of a potential collision comprising:
   a first device for collecting data associated with driver attitude;
   a second device for determining driver attitude level comprising:
      software connected to the first device for enabling storing of the collected data;
      a processor connected to the software for processing the stored data by applying pre-determined algorithm to determine a driver attitude level; and
   a third device connected to the second device for performing an action responsive to the driver attitude level.

2. The system of claim 1, wherein the first device is capable of collecting data corresponding to a driver's actions in a plurality of driving conditions.

3. The system of claim 1, wherein the first device is capable of collecting data corresponding to actions from a plurality of drivers.

4. The device of claim 1, wherein the first device is a sensor connected to an automobile.

5. The system of claim 1, wherein the second device further comprising software for enabling selection of data according to pre-determined criteria; and wherein the processor is capable of processing the selected data.

6. The system of claim 1, wherein the third device comprises:

software for enabling a determination of the timing for issuing warning responsive to the driver attitude level.

7. The system of claim 6, wherein the third device further comprises an alarm for generating a perceptible signal.

8. The system of claim 7, wherein the alarm is selected from the group comprising an audio alarm, a visual alarm, and a tactile alarm.

9. The system of claim 1, wherein the third device is integrated in a cruise control of the vehicle.

10. The system of claim 9, wherein the third device comprises software for enabling a determination of rate of change of speed in terms of acceleration and deceleration responsive to the driver attitude level; and an acceleration and deceleration control for adjusting the rate of change of speed in terms of acceleration or deceleration based on the determined rate of change.

11. The system of claim 9, wherein the third device comprises software for enabling a determination of a safety distance from another vehicle based on the driver attitude level, a distance control for maintaining the distance from the other vehicle based on the determined safety distance.

12. The system of claim 11, wherein the third device includes an alarm for warning the driver when the determined safety distance is violated.

13. A system integrated in a vehicle for forewarning a driver of a potential collision comprising:
  a first device for collecting data associated with driver attitude;
  a second device for determining driver attitude level comprising:
    software connected to the first device for enabling storing of the collected data;
    a processor connected to the software for processing the stored data by applying pre-determined algorithm to determine a driver attitude level; and
  a third device connected to the second device for performing an action responsive to the driver attitude level,
  wherein the software further enables:
  collecting data corresponding to a plurality of parametric models (PMs) relating to driver attitude level of an individual driver;
  determining parametric model (PM) value distribution for each PM from the collected data;
  determining an average value for each PM value distribution; and
  determining a parametric-specific attitude level for each PM my mapping the average value for each PM value distribution to a pre-determined scale specific to each PM.

14. A system integrated in a vehicle for forewarning a driver of a potential collision comprising:
  a first device for collecting data associated with driver attitude;
  a second device for determining driver attitude level comprising:
    software connected to the first device for enabling storing of the collected data;
    a processor connected to the software for processing the stored data by applying pre-determined algorithm to determine a driver attitude level; and
  a third device connected to the second device for performing an action responsive to the driver attitude level,
  wherein the software enables:
  collecting data corresponding to a plurality of parametric models (PMs) relating to a driver attitude level of an individual driver including at least one parametric model associated with said driver's aggression level;
  applying a pre-determined algorithm to the data to determine the driver's aggression level;
  determining timing for issuing a warning corresponding to the driver's aggression level; and
  issuing a warning based on the determined timing, wherein the step of collecting data comprises the steps of:
  determining parametric model (PM) value distribution for each PM from the collected data;
  determining an average value for each PM value distribution; and
  determining a parametric-specific attitude level for each PM by mapping the average value for each PM value distribution to a pre-determined scale specific to each PM.

* * * * *